United States Patent
Wang et al.

(10) Patent No.: US 10,341,913 B2
(45) Date of Patent: *Jul. 2, 2019

(54) METHOD FOR DETECTING UPLINK SIGNAL AND RELEVANT DEVICE AND SYSTEM

(71) Applicant: HUAWEI TECHNOLOGIES CO., LTD., Shenzhen (CN)

(72) Inventors: Yan Wang, Beijing (CN); Zhiyu Yan, Beijing (CN); Qiang Li, Shenzhen (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

This patent is subject to a terminal disclaimer.

(21) Appl. No.: 15/595,625

(22) Filed: May 15, 2017

(65) Prior Publication Data
US 2017/0251447 A1 Aug. 31, 2017

Related U.S. Application Data

(63) Continuation of application No. 14/548,802, filed on Nov. 20, 2014, now Pat. No. 9,681,346, which is a
(Continued)

(51) Int. Cl.
*H04W 36/04* (2009.01)
*H04W 56/00* (2009.01)
(Continued)

(52) U.S. Cl.
CPC ....... *H04W 36/04* (2013.01); *H04W 36/0072* (2013.01); *H04W 56/001* (2013.01);
(Continued)

(58) Field of Classification Search
CPC ........... H04W 72/0413; H04W 72/082; H04W 36/0016; H04W 36/04; H04W 72/0426;
(Continued)

(56) References Cited

U.S. PATENT DOCUMENTS 8,849,263 B2 * 9/2014 Jung ................ H04W 36/0055
455/415
8,855,044 B2 10/2014 Liao et al.
(Continued)

FOREIGN PATENT DOCUMENTS

| CN | 101790171 | 7/2010 |
| CN | 101990774 | 3/2011 |

(Continued)

OTHER PUBLICATIONS

International Search Report dated Feb. 28, 2013, in corresponding International Patent Application No. PCT/CN2012/075830.
(Continued)

*Primary Examiner* — Will W Lin
(74) *Attorney, Agent, or Firm* — Staas & Halsey LLP (57) ABSTRACT

A method for detecting an uplink signal includes: detecting, by a micro base station according to configuration information about an uplink signal sent by a UE, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1|\geq 0$; and if it is detected that the uplink signal is not received in the uplink receive window of the macro base station, after the micro base station advances the uplink receive window of the macro base station by a length of at least one cyclic prefix, detecting, by the micro base station, the uplink signal, and sending the uplink signal to the macro base station.

14 Claims, 8 Drawing Sheets

---

A micro base station detects, according to configuration information about an uplink signal sent by a UE, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1|\geq 0$. — 201

If it is detected that the uplink signal is not received in the uplink receive window of the macro base station, after advancing the uplink receive window of the macro base station by a length of at least one CP, the micro base station again detects the uplink signal and sends the uplink signal to the macro base station. — 202

Related U.S. Application Data continuation of application No. PCT/CN2012/075830, filed on May 21, 2012.

(51) Int. Cl.
*H04W 36/00* (2009.01)
*H04W 72/04* (2009.01)
*H04W 88/02* (2009.01)

(52) U.S. Cl.
CPC ... *H04W 56/0005* (2013.01); *H04W 56/0045* (2013.01); *H04W 72/0413* (2013.01); *H04W 72/0426* (2013.01); *H04W 88/02* (2013.01)

(58) Field of Classification Search
CPC .............. H04W 36/0072; H04W 88/02; H04W 56/001; H04W 56/0005; H04W 56/0045
See application file for complete search history.

(56) References Cited

U.S. PATENT DOCUMENTS

| | | | | |
|---|---|---|---|---|
| 2006/0281461 | A1* | 12/2006 | Kwun | .................... H04W 28/18 455/436 |
| 2009/0175248 | A1* | 7/2009 | Kim | .................... H04W 74/002 370/336 |
| 2009/0197631 | A1 | 8/2009 | Palanki et al. | |
| 2012/0002577 | A1* | 1/2012 | Ishii | .................... H04W 72/082 370/281 |
| 2012/0165021 | A1* | 6/2012 | Jung | ................. H04W 36/0055 455/437 |
| 2013/0028211 | A1* | 1/2013 | Li | ......................... H04L 5/0048 370/329 |
| 2013/0294418 | A1 | 11/2013 | Vukovic | |

FOREIGN PATENT DOCUMENTS

| | | |
|---|---|---|
| CN | 102045830 | 5/2011 |
| EP | 2 391 159 A1 | 11/2011 |
| JP | 2004-297756 | 10/2004 |
| JP | 2012-532573 | 12/2012 |
| WO | 2011/005727 A2 | 1/2011 |

OTHER PUBLICATIONS

Partial European Search Report dated Jun. 18, 2015 in corresponding European Patent Application No. 12877520.2.
Japanese Office Action dated Jan. 5, 2016 in corresponding Japanese Patent Application No. 2015-512978.
"Consideration on UL interference Solutions", 3GPP TSG RAN WG3 #75bis meeting, Prague, Czech Republic, May 21-25, 2012, R3-120976, 4 pp.
"Carrier-based HetNet ICIC", 3GPP TSG-RAN WG3 #74, Nov. 14-18, 2011, San Francisco, CA, USA, R3-112965, 6 pp.
"TP on UL Interference solutions for Carrier Based HetNet", 3GPP TSG-RAN WG3 #75bis, Cabo San Lucas, Mexico, Mar. 26-30, 2012, R3-120806, 5 pp.
Office Action for co-pending U.S. Appl. No. 14/548,802, dated May 23, 2016.
Notice of Allowance for co-pending U.S. Appl. No. 14/548,802, dated Feb. 13, 2017.

* cited by examiner

FIG. 1

| A micro base station detects, according to configuration information about an uplink signal sent by a UE, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1|\geq 0$. | 201 |

| If it is detected that the uplink signal is not received in the uplink receive window of the macro base station, after advancing the uplink receive window of the macro base station by a length of at least one CP, the micro base station again detects the uplink signal and sends the uplink signal to the macro base station. | 202 |

| A UE receives a TA update message sent by a macro base station, where the TA update message is used for instructing to decrease TA allocated by the macro base station to the UE to preset TA. | 701 |

↓

| After decreasing the TA allocated by the macro base station to the preset TA, the UE sends an uplink signal according to the preset TA, so that a micro base station detects the uplink signal in an uplink receive window of the macro base station according to configuration information about the uplink signal and sends the uplink signal to the macro base station, where the UE is served by the macro base station, and the UE is located outside a downlink coverage area of the micro base station and at an edge of the downlink coverage area of the micro base station; and the macro base station and the micro base station have synchronized clock rates, there is a fixed time difference t1 between the uplink receive window of the macro base station and an uplink receive window of the micro base station, and $|t1| \geq 0$. | 702 |

FIG. 7

| A macro base station sends a TA update message to a UE, where the TA update message is used for instructing the UE to decrease TA allocated by the macro base station to 1/2 of the original TA. | 801 |

↓

| The UE decreases the TA allocated by the macro base station to 1/2 of the original TA, and sends an uplink signal according to the decreased TA. | 802 |

↓

| If clocks of a micro base station and the macro base station are perfectly aligned, that is to say, $|t1|=0$, the micro base station detects the uplink signal in an uplink receive window of the micro base station (or in an uplink receive window of the macro base station, the two are the same); and if the clocks of the micro base station and the macro base station are not aligned, that is to say, $|t1| \neq 0$, the micro base station detects the uplink signal in the uplink receive window of the macro base station (at this time, there is a fixed time difference t1 between the uplink receive window of the macro base station and the uplink receive window of the micro base station). | 803 |

↓

| The micro base station sends the detected uplink signal to the macro base station, so that the macro base station can identify the UE causing uplink interference to the micro base station, thereby eliminating the interference. | 804 |

METHOD FOR DETECTING UPLINK SIGNAL AND RELEVANT DEVICE AND SYSTEM

CROSS-REFERENCE TO RELATED APPLICATIONS

This application is a continuation of U.S. patent application Ser. No. 14/548,802, filed on Nov. 20, 2014, which is a continuation of International Application No. PCT/CN2012/075830, filed on May 21, 2012, All of the afore-mentioned patent applications are hereby incorporated by reference in their entireties.

TECHNICAL FIELD

The present invention relates to the field of communications technologies, and in particular, to a method for detecting an uplink signal and a relevant device and system.

BACKGROUND

As the number of user terminals (User Equipment, UE) constantly increases, micro base stations are increasingly deployed in a network of an operator, so as to distribute the data traffic of a macro base station and lower the processing pressure of the macro base station. This kind of network with mixed deployment of a macro base station and micro base stations is also referred to as a heterogeneous network (HetNet).

Figure 1:
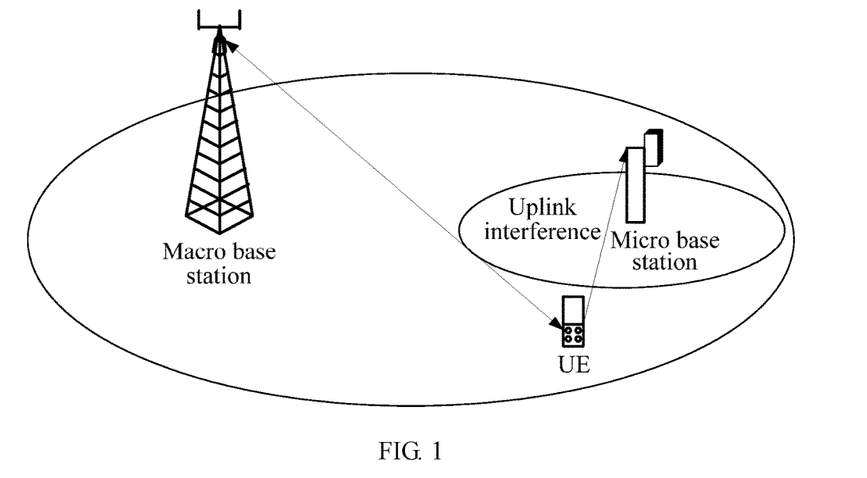
FIG. 1 is a schematic diagram of an existing heterogeneous network.

Referring to FIG. 1, FIG. 1 is a schematic diagram of an existing heterogeneous network. In the heterogeneous network shown in FIG. 1, when a UE served by a macro base station is outside a downlink coverage area of a micro base station and is located at an edge of the downlink coverage area of the micro base station, an uplink signal from the UE served by the macro base station to the macro base station causes uplink interference to the micro base station, and in this case, the UE served by the macro base station may be referred to as an interference source of the micro base station. To identify an interference source of a micro base station, some methods are currently put forward in the industry. These methods include: detecting, by a micro base station, an uplink sounding reference signal (SRS), an uplink preamble, or an uplink demodulation reference signal (DMRS) of a UE served by a macro base station, and feeding the uplink sounding reference signal, the uplink preamble, or the uplink demodulation reference signal back to the macro base station; and completing, by the macro base station, identification of an interference source.

In actual application, a base station can only successfully detect an uplink signal when the uplink signal of a UE served by the base station reaches the base station in an interval from a starting point of a receive window of the base station to ending of a cyclic prefix (CP). To meet this requirement, the base station generally allocates timing advanced (TA) to the UE, so as to enable the UE to learn how long the uplink signal should be sent ahead of time, so that the uplink signal of the UE may reach the base station in the interval from the starting point of the receive window of the base station to the ending of the cyclic prefix (CP).

In a heterogeneous network, when a UE served by a macro base station is outside a downlink coverage area of a micro base station, but is located at an edge of the downlink coverage area of the micro base station, the UE served by the macro base station sends an uplink signal by using TA allocated by the macro base station, because the UE is far from the macro base station, the TA allocated by the macro base station to the UE is generally large; because the UE is close to the micro base station, the uplink signal sent by the UE may reach the micro base station before a starting point of a receive window of the micro base station, so that the micro base station cannot detect the uplink signal sent by the UE.

SUMMARY

To solve the technical problems, embodiments of the present invention provide a method for detecting an uplink signal and a relevant device and system, so as to effectively detect an uplink signal of a UE.

In one aspect, an embodiment of the present invention provides a method for detecting an uplink signal, which includes:

detecting, by a micro base station according to configuration information of a user equipment for sending an uplink signal, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1| \geq 0$; and if it is detected that the uplink signal is not received in the uplink receive window of the macro base station, after the micro base station advances the uplink receive window of the macro base station by a length of at least one cyclic prefix, again detecting, by the micro base station, the uplink signal, and sending the uplink signal to the macro base station.

In another aspect, an embodiment of the present invention provides a method for detecting an uplink signal, which includes:

receiving, by a user equipment, a timing advanced update message sent by a macro base station, where the timing advanced update message is used for instructing to decrease timing advanced allocated by the macro base station to the user equipment to preset timing advanced; and after the user equipment decreases the timing advanced allocated by the macro base station to the preset timing advanced, sending, by the user equipment, an uplink signal according to the preset timing advanced, so that a micro base station detects the uplink signal in an uplink receive window of the macro base station according to configuration information of the user equipment for sending the uplink signal and sends the uplink signal to the macro base station, where the macro base station and the micro base station have synchronized clock rates, there is a fixed time difference t1 between the uplink receive window of the macro base station and an uplink receive window of the micro base station, and $|t1| \geq 0$.

Correspondingly, in one aspect, an embodiment of the present invention provides a device for detecting an uplink signal applied in a micro base station, and the device for detecting an uplink signal includes:

a detecting unit, configured to detect, according to configuration information of a user equipment for sending an uplink signal, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1| \geq 0$;

a control unit, configured to advance the uplink receive window of the macro base station by a length of at least one cyclic prefix when the detecting unit detects that the uplink signal is not received in the uplink receive window of the macro base station, where the detecting unit is further configured to detect the uplink signal after the control unit advances the uplink receive window of the macro base station by the length of at least one cyclic prefix; and a sending unit, configured to send the uplink signal detected by the detecting unit to the macro base station.

Correspondingly, in another aspect, an embodiment of the present invention provides a user equipment, and the user equipment includes:

a receiving unit, configured to receive a timing advanced update message sent by a macro base station, where the timing advanced update message is used for instructing to decrease timing advanced allocated by the macro base station to the user equipment to preset timing advanced;

a control unit, configured to decrease the timing advanced allocated by the macro base station to the preset timing advanced; and a sending unit, configured to, after the control unit decreases the timing advanced allocated by the macro base station to the preset timing advanced, send an uplink signal according to the preset timing advanced, so that a micro base station detects the uplink signal in an uplink receive window of the macro base station according to configuration information of the sending unit for sending the uplink signal and sends the uplink signal to the macro base station, where the macro base station and the micro base station have synchronized clock rates, there is a fixed time difference t1 between the uplink receive window of the macro base station and an uplink receive window of the micro base station, and $|t1|\geq 0$.

Correspondingly, in one aspect, an embodiment of the present invention further provides a system for detecting an uplink signal, which includes:

a user equipment, a micro base station, and a macro base station, where the user equipment is served by the macro base station, and the user equipment is located outside a downlink coverage area of the micro base station and at an edge of the downlink coverage area of the micro base station; and the macro base station and the micro base station have synchronized clock rates, there is a fixed time difference t1 between an uplink receive window of the macro base station and an uplink receive window of the micro base station, and $|t1|\geq 0$;

the micro base station includes the above device for detecting an uplink signal;

the user equipment is configured to send an uplink signal; and the macro base station is configured to receive the uplink signal sent by the user equipment and detected by the micro base station.

Correspondingly, in another aspect, an embodiment of the present invention further provides another system for detecting an uplink signal, which includes:

a micro base station, a macro base station, and the user equipment provided by the embodiment of the present invention in another aspect, where the user equipment is served by the macro base station, and the user equipment is located outside a downlink coverage area of the micro base station and at an edge of the downlink coverage area of the micro base station; and the macro base station and the micro base station have synchronized clock rates, there is a fixed time difference t1 between an uplink receive window of the macro base station and an uplink receive window of the micro base station, and $|t1|\geq 0$;

the macro base station is configured to send a timing advanced update message to the user equipment, where the timing advanced update message is used for instructing to decrease timing advanced allocated by the macro base station to the user equipment to preset timing advanced; and receive an uplink signal sent by the user equipment and detected by the micro base station; and the micro base station is configured to detect the uplink signal in the uplink receive window of the macro base station according to configuration information about the uplink signal sent by the user equipment, and send the uplink signal to the macro base station.

In the embodiments of the present invention, the macro base station and the micro base station have synchronized clock rates, and there is a fixed time difference t1 between the uplink receive window of the macro base station and the uplink receive window of the micro base station, where $|t1|\geq 0$. On such basis, in one aspect, the micro base station may detect, according to the configuration information of the user equipment for sending an uplink signal, whether the uplink signal is received in the uplink receive window of the macro base station, and if not, after advancing the uplink receive window of the macro base station by the length of at least one cyclic prefix, the micro base station may again detect the uplink signal and send the uplink signal to the macro base station. In another aspect, after decreasing the timing advanced allocated by the macro base station to the preset timing advanced according to a timing advanced update message sent by the macro base station, the user equipment may send an uplink signal according to the preset timing advanced, so that the micro base station may detect the uplink signal in the uplink receive window of the macro base station according to the configuration information of the user equipment for sending the uplink signal, and send the uplink signal to the macro base station. Therefore, it is implemented that the micro base station effectively detects the uplink signal of the user equipment, so that the macro base station can identify the user equipment causing uplink interference to the micro base station, thereby eliminating the interference. Meanwhile, in the embodiments of the present invention, the processing burden caused by multiple times of detection constantly performed by the micro base station on all resources may also be avoided.

BRIEF DESCRIPTION OF DRAWINGS

To illustrate the technical solutions of the embodiments of the present invention more clearly, the accompanying drawings for describing the embodiments are briefly described below. Apparently, the accompanying drawings in the following description are only some embodiments of the present invention, and persons of ordinary skill in the art may derive other drawings from the accompanying drawings without creative efforts.

FIG. 2 to FIG. 8 are schematic flow charts of several embodiments of a method for detecting an uplink signal provided in an embodiment of the present invention;

DESCRIPTION OF EMBODIMENTS

The following clearly and comprehensively describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention provide a method for detecting an uplink signal and a relevant device and system, which may effectively detect an uplink signal of a UE, including a UE served by a macro base station and located outside a downlink coverage area of a micro base station and at an edge of the downlink coverage area of the micro base station, so that the macro base station may identify a user equipment causing uplink interference to the micro base station, thereby eliminating the interference, and further avoiding the processing burden caused by multiple times of detection constantly performed by the micro base station on all resources, which are respectively illustrated in detail in the following.

Figure 2:
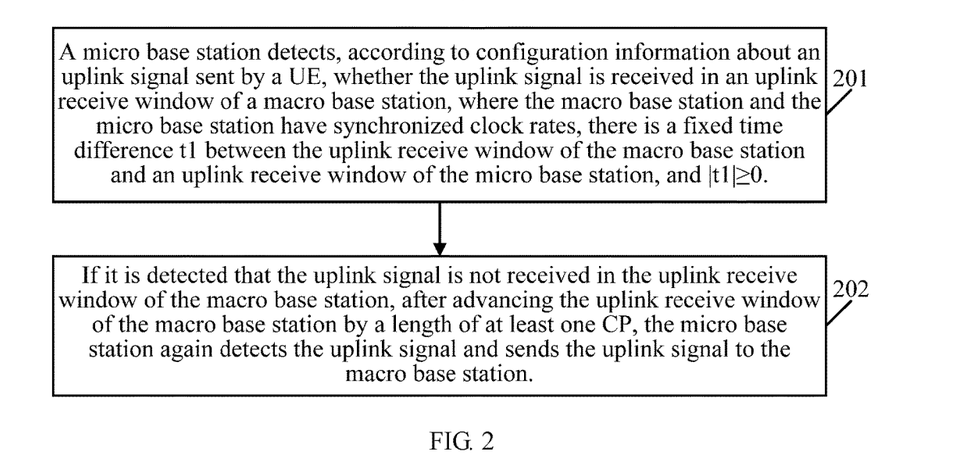

Referring to FIG. 2, FIG. 2 is a flow chart of a method for detecting an uplink signal provided in an embodiment of the present invention. As shown in FIG. 2, the method for detecting an uplink signal may include the following steps.

201: A micro base station detects, according to configuration information of a UE for sending an uplink signal, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and $|t1|\geq 0$.

In an embodiment, the UE may be served by the macro base station, and the UE may be located outside a downlink coverage area of the micro base station and at an edge of the downlink coverage area of the micro base station. Therefore, the micro base station may effectively detect an uplink signal of the UE served by the macro base station and located outside the downlink coverage area of the micro base station and at an edge of the downlink coverage area of the micro base station, so that the macro base station may identify a user equipment causing uplink interference to the micro base station, thereby eliminating the interference.

In an embodiment, the configuration information used for sending the uplink signal may include a sending frequency, sending time, a hopping sequence and the like used for sending the uplink signal. That is to say, the configuration information used for sending the uplink signal may at least include a sending resource used for sending the uplink signal.

In the embodiment of the present invention, when $|t1|=0$, it indicates that clocks of the macro base station and the micro base station are perfectly aligned, and at this time, the uplink receive window of the macro base station and the uplink receive window of the micro base station are the same. When $|t1|\neq 0$, it indicates that the clocks of the macro base station and the micro base station are not aligned, and at this time, there is a fixed time difference t1 between the uplink receive window of the macro base station and the uplink receive window of the micro base station.

202: If it is detected that the uplink signal is not received in the uplink receive window of the macro base station, after advancing the uplink receive window of the macro base station by a length of at least one CP, the micro base station again detects the uplink signal and sends the uplink signal to the macro base station.

In actual application, if it is detected that the uplink signal is not received in the uplink receive window of the macro base station, the micro base station may again detect the uplink signal after advancing the uplink receive window of the macro base station by a length of one CP, and if the uplink signal still cannot be detected, the micro base station may again detect the uplink signal after further advancing the uplink receive window of the macro base station by a length of two CPs until the micro base station detects the uplink signal after advancing the uplink receive window of the macro base station by a length of N CPs; and the micro base station sends the uplink signal to the macro base station.

In an embodiment, if it is detected that the uplink signal is received in the uplink receive window of the macro base station, the micro base station may also send the uplink signal or relevant information (for example, a UE identifier) about the uplink signal to the macro base station, so that the macro base station may identify the user equipment causing uplink interference to the micro base station, thereby eliminating the interference.

As an optional implementation manner, in the method for detecting an uplink signal shown in FIG. 2, before step 201, the micro base station may also receive and store configuration information, sent by the macro base station, about the uplink signal sent by the UE.

As another optional implementation manner, in the method for detecting an uplink signal shown in FIG. 2, before step 201, the micro base station and the macro base station may also negotiate configuration information about the uplink signal sent by the UE, which is not limited in the embodiment of the present invention.

As an optional implementation manner, in the method for detecting an uplink signal shown in FIG. 2, the uplink signal may be any one of an uplink SRS, an uplink Preamble, and an uplink DMRS, which is not limited in the embodiment of the present invention.

In the method for detecting an uplink signal shown in FIG. 2, the macro base station and the micro base station have synchronized clock rates, and there is a fixed time difference t1 between the uplink receive window of the macro base station and the uplink receive window of the micro base station, where $|t1|\geq 0$. On such basis, the micro base station may detect, according to the configuration information about the uplink signal sent by the UE, whether the uplink signal is received in the uplink receive window of the macro base station, and if not, after advancing the uplink receive window of the macro base station by the length of at least one CP, the micro base station may again detect the uplink signal and send the uplink signal to the macro base station. Therefore, it is implemented that the micro base station effectively detects on the uplink signal sent by the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

Figure 3:
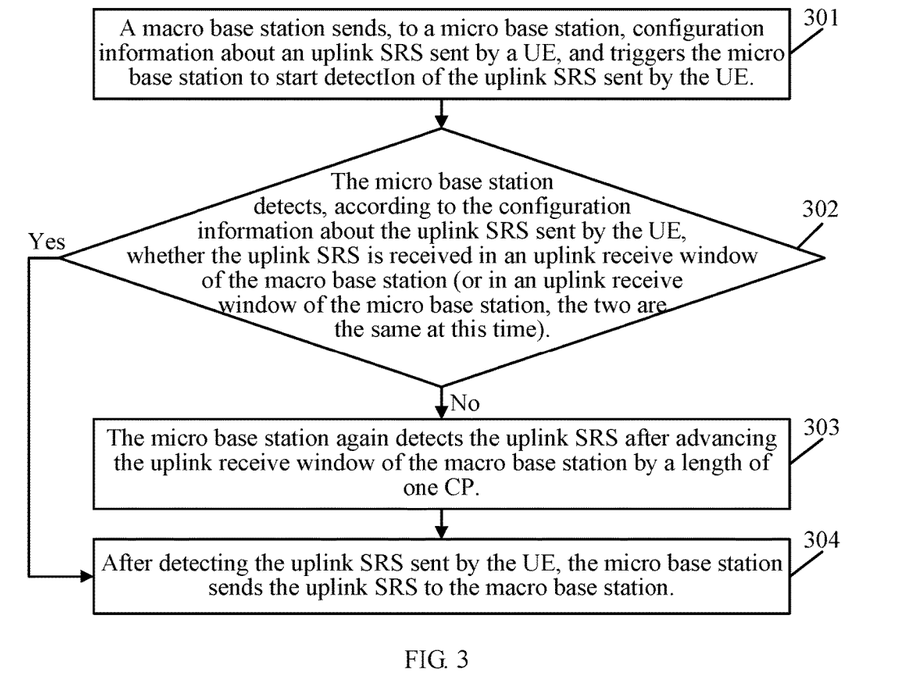

Referring to FIG. 3, FIG. 3 is a flow chart of another method for detecting an uplink signal provided in an embodiment of the present invention. In the method for detecting an uplink signal shown in FIG. 3, it is assumed that a UE is served by a macro base station, and the UE is located outside a downlink coverage area of a micro base station and at an edge of the downlink coverage area of the micro base station; meanwhile, the macro base station and the micro base station have synchronized clock rates, and there is a fixed time difference t1 between an uplink receive window of the macro base station and an uplink receive window of the micro base station, where |t1|=0. That is to say, clocks of the macro base station and the micro base station are perfectly aligned, and at this time, the uplink receive window of the macro base station and the uplink receive window of the micro base station are the same. As shown in FIG. 3, the method for detecting an uplink signal may include the following steps.

301: The macro base station sends, to the micro base station, configuration information about an uplink SRS sent by the UE, and triggers the micro base station to start detection of the uplink SRS sent by the UE.

302: The micro base station detects, according to the configuration information about the uplink SRS sent by the UE, whether the uplink SRS is received in the uplink receive window of the macro base station (or in the uplink receive window of the micro base station, which is the same as the uplink receive window of the macro base station at this time), if yes, execute step 304, and if not, execute step 303 and step 304.

303: When the micro base station detects that the uplink SRS is not received in the uplink receive window of the macro base station (or in the uplink receive window of the micro base station, which is the same as the uplink receive window of the macro base station at this time) in step 302, the micro base station may again detect the uplink SRS after advancing the uplink receive window of the macro base station by a length of one CP, and execute step 304.

It is shown in practice that when the UE sends the uplink SRS according to the normal TA configured by the macro base station, it is very likely that the uplink SRS reaches the micro base station before a starting point of the uplink receive window of the micro base station (which is the same as the uplink receive window of the macro base station at this time), and in most cases, timing advanced when the uplink SRS reaches the starting point of the uplink receive window of the micro base station (which is the same as the uplink receive window of the macro base station at this time) in advance does not exceed the length of one CP. That is to say, if a starting point of the uplink receive window of the macro base station is 0, the time when the uplink SRS of the UE reaches the micro base station is generally in a range of [−CP, +CP]. Therefore, the micro base station may effectively detect the uplink SRS after advancing the uplink receive window of the macro base station by the length of one CP.

304: After detecting the uplink SRS sent by the UE, the micro base station sends the uplink SRS or relevant information (for example, a UE identifier) about the uplink SRS to the macro base station.

After receiving the uplink SRS sent by the micro base station, the macro base station may identify that the UE sending the uplink SRS causes uplink interference to the micro base station. That is to say, the UE is an uplink interference source of the micro base station, and at this time, the macro base station may eliminate the interference of the UE. A specific implementation manner in which the macro base station may eliminate the interference of the UE is common knowledge to persons of ordinary skill in the art, so details are not described herein again in the embodiment of the present invention.

In the method for detecting an uplink signal shown in FIG. 3, step 302 and step 303 may be arranged in a different order, or may be executed in parallel, which is not limited in the embodiment of the present invention. Further, execution of step 302 may be triggered by step 301, and termination of step 303 may be triggered by step 304. Of course, the execution of step 302 may also be triggered by specific signaling between the macro base station and the micro base station, and the termination of step 303 may also be triggered by specific signaling between the macro base station and the micro base station, which is not limited in the embodiment of the present invention.

In an embodiment, the uplink SRS in the method for detecting an uplink signal shown in FIG. 3 may also be replaced with an uplink Preamble or an uplink DMRS, which does not influence implementation of the present invention and is not limited in the embodiment of the present invention.

In the method for detecting an uplink signal shown in FIG. 3, the UE is served by the macro base station, and the UE is located outside the downlink coverage area of the micro base station and at an edge of the downlink coverage area of the micro base station; meanwhile, the macro base station and the micro base station have synchronized clock rates, and there is a fixed time difference t1 between the uplink receive window of the macro base station and the uplink receive window of the micro base station, where |t1|=0. On such basis, the micro base station may detect, according to the configuration information about the uplink SRS sent by the UE, whether the uplink signal is received in the uplink receive window of the macro base station, and if not, after advancing the uplink receive window of the macro base station by the length of at least one CP, the micro base station may again detect the uplink SRS and send the uplink SRS to the macro base station. Therefore, it is implemented that the micro base station effectively detects the uplink SRS of the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

Figure 4:
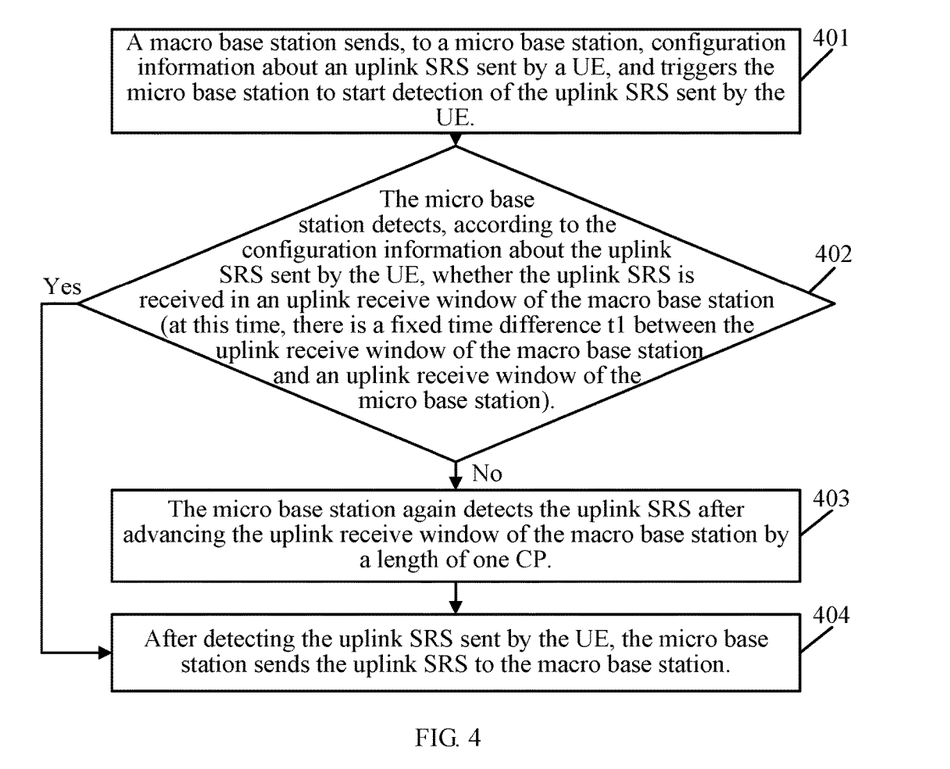

Referring to FIG. 4, FIG. 4 is a flow chart of another method for detecting an uplink signal provided in an embodiment of the present invention. In the method for detecting an uplink signal shown in FIG. 4, it is assumed that a UE is served by a macro base station, and the UE is located outside a downlink coverage area of a micro base station and at an edge of the downlink coverage area of the micro base station; meanwhile, the macro base station and the micro base station have synchronized clock rates, and there is a fixed time difference t1 between an uplink receive window of the macro base station and an uplink receive window of the micro base station, where |t1|≠1. That is to say, clocks of the macro base station and the micro base station are not aligned. As shown in FIG. 4, the method for detecting an uplink signal may include the following steps.

401: The macro base station sends, to the micro base station, configuration information about an uplink SRS sent by the UE, and triggers the micro base station to start detection of the uplink SRS sent by the UE.

402: The micro base station detects, according to the configuration information about the uplink SRS sent by the UE, whether the uplink SRS is received in the uplink receive window of the macro base station (at this time, there is a fixed time difference t1 between the uplink receive window of the macro base station and the uplink receive window of the micro base station), if yes, execute step 404, and if not, execute step 403 and step 404.

403: When the micro base station detects that the uplink SRS is not received in the uplink receive window of the macro base station (or in the uplink receive window of the micro base station, which is the same as the uplink receive window of the macro base station at this time) in step 402, the micro base station may again detect the uplink SRS after advancing the uplink receive window of the macro base station by a length of one CP, and execute step 404.

404: After detecting the uplink SRS sent by the UE, the micro base station sends the uplink SRS or relevant information (for example, a UE identifier) about the uplink SRS to the macro base station.

After receiving the uplink SRS sent by the micro base station, the macro base station may identify that the UE sending the uplink SRS causes uplink interference to the micro base station. That is to say, the UE is an uplink interference source of the micro base station, and at this time, the macro base station may eliminate the interference of the UE. A specific implementation manner in which the macro base station may eliminate the interference of the UE is common knowledge to persons of ordinary skill in the art, so details are not described herein again in the embodiment of the present invention.

In the method for detecting an uplink signal shown in FIG. 4, step 402 and step 403 may be arranged in a different order, or may be executed in parallel, which is not limited in the embodiment of the present invention. Further, execution of step 402 may be triggered by step 401, and termination of step 403 may be triggered by step 404. Of course, the execution of step 402 may also be triggered by specific signaling between the macro base station and the micro base station, and the termination of step 403 may also be triggered by specific signaling between the macro base station and the micro base station, which is not limited in the embodiment of the present invention.

In an embodiment, the uplink SRS in the method for detecting an uplink signal shown in FIG. 4 may also be replaced with an uplink Preamble or an uplink DMRS, which does not influence implementation of the present invention and is not limited in the embodiment of the present invention.

In the method for detecting an uplink signal shown in FIG. 4, the UE is served by the macro base station, and the UE is located outside the downlink coverage area of the micro base station and at an edge of the downlink coverage area of the micro base station; meanwhile, the macro base station and the micro base station have synchronized clock rates, and there is a fixed time difference t1 between the uplink receive window of the macro base station and the uplink receive window of the micro base station have, where $|t1| \neq 0$. On such basis, the micro base station may detect, according to the configuration information about the uplink SRS sent by the UE, whether the uplink signal is received in the uplink receive window of the macro base station, and if not, after advancing the uplink receive window of the macro base station by the length of at least one CP, the micro base station may again detect the uplink SRS and send the uplink SRS to the macro base station. Therefore, it is implemented that the micro base station effectively detects the uplink SRS of the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

Figure 5:
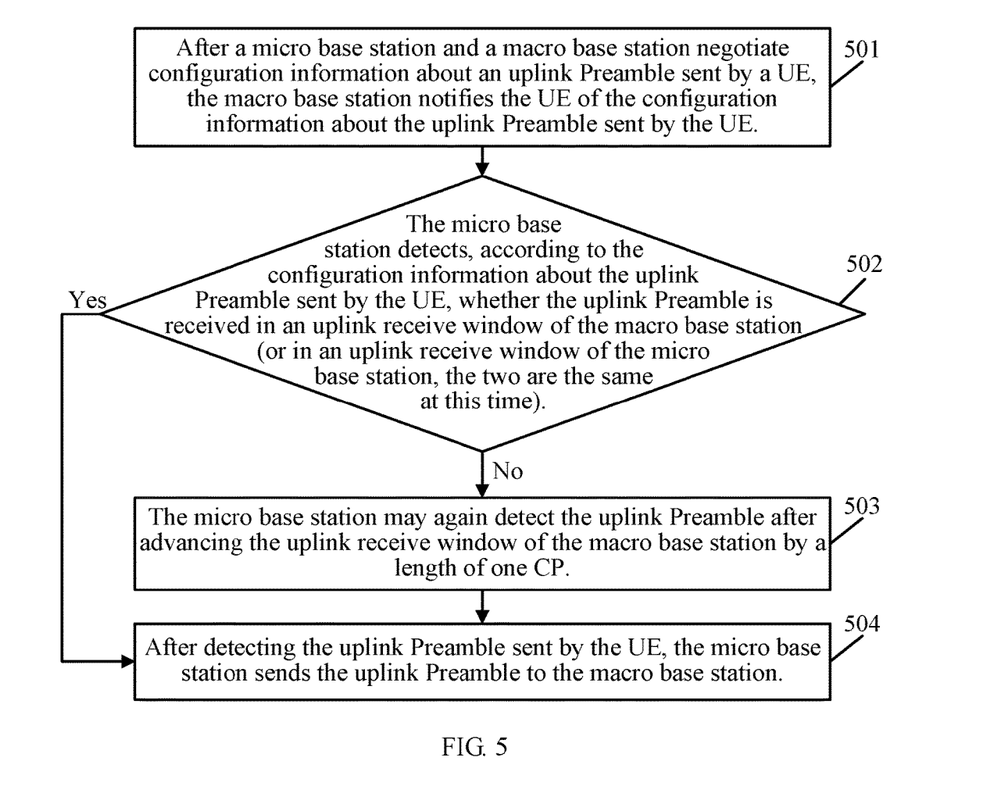

Referring to FIG. 5, FIG. 5 is a flow chart of another method for detecting an uplink signal provided in an embodiment of the present invention. In the method for detecting an uplink signal shown in FIG. 5, it is assumed that a UE is served by a macro base station, and the UE is located outside a downlink coverage area of a micro base station and at an edge of the downlink coverage area of the micro base station; meanwhile, the macro base station and the micro base station have synchronized clock rates, and there is a fixed time difference t1 between an uplink receive window of the macro base station and an uplink receive window of the micro base station, where $|t1|=0$. That is to say, clocks of the macro base station and the micro base station are perfectly aligned, and at this time, the uplink receive window of the macro base station and the uplink receive window of the micro base station are the same. As shown in FIG. 5, the method for detecting an uplink signal may include the following steps.

501: After the micro base station and the macro base station negotiate configuration information about an uplink Preamble sent by the UE, the macro base station notifies the UE of the configuration information about the uplink Preamble sent by the UE.

In an embodiment, the micro base station may notify the macro base station of the configuration information, selected by the micro base station, about the uplink Preamble sent by the UE, or the macro base station may notify the micro base station of the configuration information, selected by the macro base station, about the uplink Preamble sent by the UE, which is not limited in the embodiment of the present invention.

502: The micro base station detects, according to the configuration information about the uplink Preamble sent by the UE, whether the uplink Preamble is received in the uplink receive window of the macro base station (or in the uplink receive window of the micro base station, which is the same as the uplink receive window of the macro base station at this time), if yes, execute step 504, and if not, execute step 503 and step 504.

503: When the micro base station detects that the uplink Preamble is not received in the uplink receive window of the macro base station (or in the uplink receive window of the micro base station, which is the same as the uplink receive window of the macro base station at this time) in step 502, the micro base station may again detect the uplink Preamble after advancing the uplink receive window of the macro base station by a length of one CP, and execute step 504.

504: After detecting the uplink Preamble sent by the UE, the micro base station sends the uplink Preamble or relevant information (for example, a UE identifier) about the uplink Preamble to the macro base station.

After receiving the uplink Preamble sent by the micro base station, the macro base station may identify that the UE sending the uplink Preamble causes uplink interference to the micro base station. That is to say, the UE is an uplink interference source of the micro base station, and at this time, the macro base station may eliminate the interference of the UE. A specific implementation manner in which the macro base station may eliminate the interference of the UE is common knowledge to persons of ordinary skill in the art, so details are not described herein again in the embodiment of the present invention.

In the method for detecting an uplink signal shown in FIG. 5, step 502 and step 503 may be arranged in a different order, or may be executed in parallel, which is not limited in the embodiment of the present invention. Further, execution of step 502 may be triggered by step 501, and termination of step 503 may be triggered by step 504. Of course, the execution of step 502 may also be triggered by specific signaling between the macro base station and the micro base station, and the termination of step 503 may also be triggered by specific signaling between the macro base station and the micro base station, which is not limited in the embodiment of the present invention. Or, the micro base station and the macro base station may negotiate multiple pieces of configuration information used for detecting uplink preambles sent by the UE, so that the macro base station may perform continuous detection on the uplink preambles sent by the UE without triggering and stopping the detection.

In the method for detecting an uplink signal shown in FIG. 5, the UE is served by the macro base station, and the UE is located outside the downlink coverage area of the micro base station and at an edge of the downlink coverage area of the micro base station; meanwhile, the macro base station and the micro base station have synchronized clock rates, and there is a fixed time difference t1 between the uplink receive window of the macro base station and the uplink receive window of the micro base station, where $|t1|=0$. On such basis, the micro base station may negotiate the configuration information about the uplink preamble sent by the UE with the macro base station, so that the micro base station may detect, according to the configuration information about the uplink preamble sent by the UE, whether the uplink signal is received in the uplink receive window of the macro base station, and if not, after advancing the uplink receive window of the macro base station by the length of at least one CP, the micro base station may again detect the uplink SRS and send the uplink SRS to the macro base station. Therefore, it is implemented that the micro base station effectively detect the uplink preamble of the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

Figure 6:
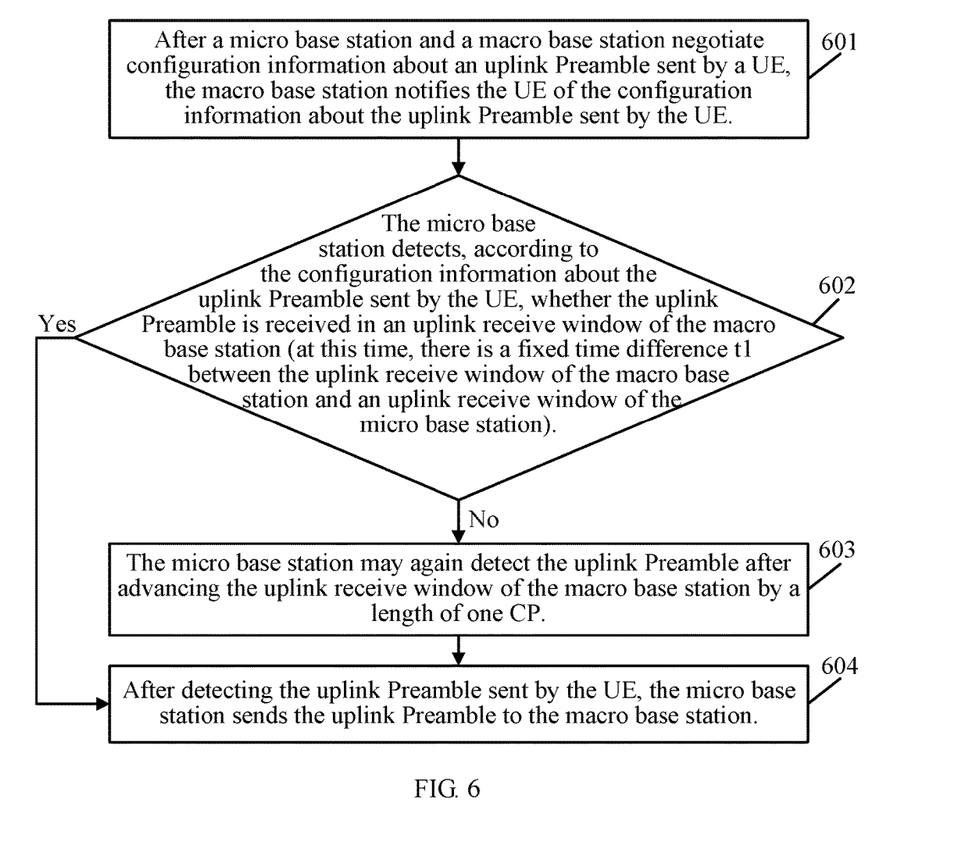

Referring to FIG. 6, FIG. 6 is a flow chart of another method for detecting an uplink signal provided in an embodiment of the present invention. In the method for detecting an uplink signal shown in FIG. 6, it is assumed that a UE is served by a macro base station, and the UE is located outside a downlink coverage area of a micro base station and at an edge of the downlink coverage area of the micro base station; meanwhile, the macro base station and the micro base station have synchronized clock rates, and there is a fixed time difference t1 between an uplink receive window of the macro base station and an uplink receive window of the micro base station, where $|t1|\neq 0$. That is to say, clocks of the macro base station and the micro base station are not aligned. As shown in FIG. 6, the method for detecting an uplink signal may include the following steps.

601: After the micro base station and the macro base station negotiate configuration information about an uplink Preamble sent by the UE, the macro base station notifies the UE of the configuration information about the uplink Preamble sent by the UE.

In an embodiment, the micro base station may notify the macro base station of the configuration information, selected by the micro base station, about the uplink Preamble sent by the UE, or the macro base station may notify the micro base station of the configuration information, selected by the macro base station, about the uplink Preamble sent by the UE, which is not limited in the embodiment of the present invention.

602: The micro base station detects, according to the configuration information about the uplink Preamble sent by the UE, whether the uplink Preamble is received in the uplink receive window of the macro base station (at this time, there is a fixed time difference t1 between the uplink receive window of the macro base station and the uplink receive window of the micro base station), if yes, execute step 604, and if not, execute step 603 and step 604.

603: When the micro base station detects that the uplink Preamble is not received in the uplink receive window of the macro base station in step 602, the micro base station may again detect the uplink Preamble after advancing the uplink receive window of the macro base station by a length of one CP, and execute step 604.

604: After detecting the uplink Preamble sent by the UE, the micro base station sends the uplink Preamble to the macro base station.

After receiving the uplink Preamble sent by the micro base station, the macro base station may identify that the UE sending the uplink Preamble causes uplink interference to the micro base station. That is to say, the UE is an uplink interference source of the micro base station, and at this time, the macro base station may eliminate the interference of the UE. A specific implementation manner in which the macro base station may eliminate the interference of the UE is common knowledge to persons of ordinary skill in the art, so details are not described herein again in the embodiment of the present invention.

In the method for detecting an uplink signal shown in FIG. 6, step 602 and step 603 may be arranged in a different order, or may be executed in parallel, which is not limited in the embodiment of the present invention. Further, execution of step 602 may be triggered by step 601, and termination of step 603 may be triggered by step 604. Of course, the execution of step 602 may also be triggered by specific signaling between the macro base station and the micro base station, and the termination of step 603 may also be triggered by specific signaling between the macro base station and the micro base station, which is not limited in the embodiment of the present invention. Or, the micro base station and the macro base station may negotiate multiple pieces of configuration information used for detecting uplink preambles sent by the UE, so that the macro base station may perform continuous detection on the uplink preambles sent by the UE without triggering and stopping the detection.

In the method for detecting an uplink signal shown in FIG. 6, the UE is served by the macro base station, and the UE is located outside the downlink coverage area of the micro base station and at an edge of the downlink coverage area of the micro base station; meanwhile, the macro base station and the micro base station have synchronized clock rates, and there is a fixed time difference t1 between the uplink receive window of the macro base station and the uplink receive window of the micro base station, where $|t1|\neq 0$. On such basis, the micro base station may negotiate the configuration information about the uplink preamble sent by the UE with the macro base station, so that the micro base station may detect, according to the configuration information about the uplink preamble sent by the UE, whether the uplink signal is received in the uplink receive window of the macro base station, and if not, after advancing the uplink receive window of the macro base station by the length of at least one CP, the micro base station may again detect the uplink SRS and send the uplink SRS to the macro base station. Therefore, it is implemented that the micro base station effectively detects the uplink preamble of the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

In the method for detecting an uplink signal shown in FIG. 2 to FIG. 6, when the micro base station detects that the uplink signal is not received in the uplink receive window of the macro base station, the micro base station may again detect the uplink signal after advancing the uplink receive window of the macro base station by the length of one CP. As an optional implementation manner, when the micro base station detects that the uplink signal is not received in the uplink receive window of the macro base station, the micro base station may also again detect the uplink signal after advancing the uplink receive window of the macro base station by a length of N CPs, where N is a natural number greater than 1. The value of N may be configured by an operation administration and maintenance (OAM) entity, and may also be calculated by the micro base station according to a difference between a distance from the UE to the macro base station and a distance from the UE to the micro base station, which is not described in detail in the embodiment of the present invention. That is to way, in the embodiment of the present invention, the two uplink receive windows in the method for detecting an uplink signal shown in FIG. 2 to FIG. 6 may be changed into multiple receive windows, where one is the uplink receive window of the macro base station, and the rest are uplink receive windows obtained by advancing the uplink receive window of the macro base station by a length of N CPs.

Referring to FIG. 7, FIG. 7 is a flow chart of another method for detecting an uplink signal provided in an embodiment of the present invention. As shown in FIG. 7, the method for detecting an uplink signal may include the following steps.

701: A UE receives a TA update message sent by a macro base station, where the TA update message is used for instructing to decrease TA allocated by the macro base station to the UE to preset TA.

The TA allocated by the macro base station to the UE refers to TA allocated by the macro base station to the UE in a normal situation.

For example, the preset TA may be ½ of the TA allocated by the macro base station to the UE, or the preset TA is another numerical value less than the TA allocated by the macro base station to the UE, which is not limited in the embodiment of the present invention.

702: After decreasing the TA allocated by the macro base station to the preset TA, the UE sends an uplink signal according to the preset TA, so that a micro base station detects the uplink signal in an uplink receive window of the macro base station according to configuration information of the UE for sending the uplink signal and sends the uplink signal to the macro base station, where the macro base station and the micro base station have synchronized clock rates, there is a fixed time difference t1 between the uplink receive window of the macro base station and an uplink receive window of the micro base station, and |t1|≥0.

In an embodiment, the UE may be served by the macro base station, and the UE may be located outside a downlink coverage area of the micro base station and at an edge of the downlink coverage area of the micro base station.

After receiving the uplink signal sent by the micro base station, the macro base station may identify that the UE sending the uplink signal causes uplink interference to the micro base station. That is to say, the UE is an uplink interference source of the micro base station, and at this time, the macro base station may eliminate the interference of the UE.

In an embodiment, the configuration information of the UE for sending the uplink signal may at least include a sending frequency channel of the UE for sending the uplink signal, that is to say, the configuration information of the UE for sending the uplink signal may at least include a sending resource of the UE for sending the uplink signal.

As an optional implementation manner, in the method for detecting an uplink signal shown in FIG. 7, the uplink signal sent by the UE may be an uplink SRS, uplink Preamble, or uplink DMRS sent by the UE, which is not limited in the embodiment of the present invention.

In the embodiment of the present invention, the macro base station and the micro base station have synchronized clock rates, and there is a fixed time difference t1 between the uplink receive window of the macro base station and the uplink receive window of the micro base station, where |t1|≥0. On such basis, after decreasing the TA allocated by the macro base station to the preset TA according to the TA update message sent by the macro base station, the UE may send an uplink signal according to the preset TA, so that the micro base station may detect the uplink signal in the uplink receive window of the macro base station according to the configuration information about the uplink signal and send the uplink signal to the macro base station. Therefore, it is implemented that the micro base station effectively detect the uplink signal of the UE, so that the macro base station can identify the user equipment causing uplink interference to the micro base station, thereby eliminating the interference. Meanwhile, in the embodiment of the present invention, the processing burden caused by multiple times of detection constantly performed by the micro base station on all resources may also be avoided.

Referring to FIG. 8, FIG. 8 is a flow chart of another method for detecting an uplink signal provided in an embodiment of the present invention. In the method shown in FIG. 8, it is assumed that a UE is served by a macro base station, and the UE is located outside a downlink coverage area of a micro base station and at an edge of the downlink coverage area of the micro base station, where the macro base station and the micro base station have synchronized clock rates, there is a fixed time difference t1 between an uplink receive window of the macro base station and an uplink receive window of the micro base station, and |t1|≥0. As shown in FIG. 8, the method for detecting an uplink signal may include the following steps.

801: The macro base station sends a TA update message to the UE, where the TA update message is used for instructing the UE to decrease TA allocated by the macro base station to ½ of the original TA.

In an embodiment, the TA update message may also instruct the UE to appropriately decrease the TA allocated by the macro base station to another numerical value, which is not limited in the embodiment of the present invention.

802: The UE decreases the TA allocated by the macro base station to ½ of the original TA, and sends an uplink signal according to the decreased TA.

803: If clocks of the micro base station and the macro base station are perfectly aligned, that is to say, |t1|=0, the micro base station detects the uplink signal in the uplink receive window of the micro base station (or in the uplink receive window of the macro base station, which is the same as the uplink receive window of the macro base station); and if the clocks of the micro base station and the macro base station are not aligned, that is to say, |t1|≠0, the micro base station detects the uplink signal in the uplink receive window of the macro base station (at this time, there is a fixed time difference t1 between the uplink receive window of the macro base station and the uplink receive window of the micro base station).

804: The micro base station sends the detected uplink signal (or relevant information about the uplink signal) to the macro base station, so that the macro base station can identify the UE causing uplink interference to the micro base station, thereby eliminating the interference.

As an optional implementation manner, in the method for detecting an uplink signal shown in FIG. 8, after the UE sends the uplink signal according to the decreased TA, the macro base station may adopt a TA update command or other new signaling to instruct the UE to adjust the decreased TA to the previously allocated TA (that is, the TA allocated by the macro base station to the UE in a normal situation).

As an optional implementation manner, in the method for detecting an uplink signal shown in FIG. 8, the uplink signal may be any one of an uplink SRS, an uplink Preamble, and an uplink DMRS, which is not limited in the embodiment of the present invention.

In actual application, because the UE is far from the macro base station, the TA allocated by the macro base station to the UE (that is, the TA allocated by the macro base station to the UE in a normal situation) is generally large; because the UE is close to the micro base station, the uplink signal sent by the UE according to the TA allocated by the macro base station may reach the micro base station before a starting point of the receive window of the micro base station, so that the micro base station cannot detect the uplink signal sent by the UE. However, in the method for detecting an uplink signal shown in FIG. 8, after decreasing the TA allocated by the macro base station to ½ of the original TA or another numerical value according to the instruction of the TA update message sent by the macro base station, the UE sends the uplink signal according to the decreased TA, so that it may be ensured that the uplink signal sent by the UE is detected by the micro base station in the uplink receive window of the micro base station or in the uplink receive window of the macro base station.

Figure 9:
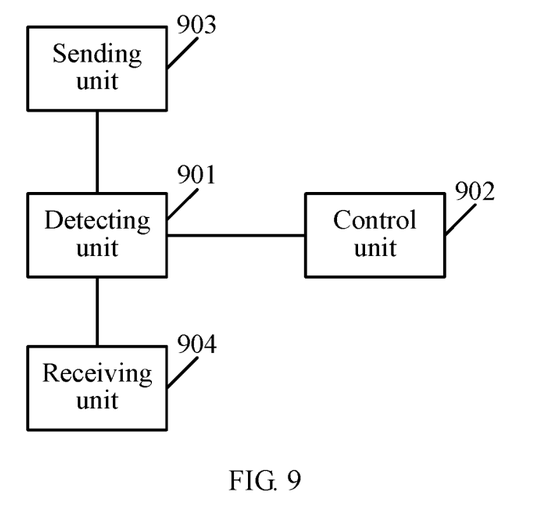
FIG. 9 is a schematic structural diagram of an embodiment of a device for detecting an uplink signal provided in an embodiment of the present invention.

Referring to FIG. 9, FIG. 9 is a structural diagram of a device for detecting an uplink signal provided in an embodiment of the present invention, and the device for detecting an uplink signal is applied in a micro base station. As shown in FIG. 9, the device for detecting an uplink signal may include a detecting unit 901, a control unit 902, and a sending unit 903, where the detecting unit 901 is configured to detect, according to configuration information of a UE for sending an uplink signal, whether the uplink signal is received in an uplink receive window of a macro base station, where the macro base station and the micro base station have synchronized clock rates, there is a fixed time difference t1 between the uplink receive window of the macro base station and an uplink receive window of the micro base station, and |t1|≥0.

In an embodiment, the UE may be served by the macro base station, and the UE may be located outside a downlink coverage area of the micro base station and at an edge of the downlink coverage area of the micro base station.

The control unit 902 is configured to advance the uplink receive window of the macro base station by a length of at least one CP when the detecting unit 901 detects that the uplink signal is not received in the uplink receive window of the macro base station.

The detecting unit 901 is further configured to detect the uplink signal after the control unit 902 advances the uplink receive window of the macro base station by the length of at least one CP.

The sending unit 903 is configured to send the uplink signal detected by the detecting unit 901 to the macro base station.

After receiving the uplink signal, sent by the sending unit 903, of the device for detecting an uplink signal applied in the micro base station, the macro base station may identify that the UE sending the uplink signal causes uplink interference to the micro base station. That is to say, the UE is an uplink interference source of the micro base station, and at this time, the macro base station may eliminate the interference of the UE.

In an embodiment, the device for detecting an uplink signal shown in FIG. 9 may also include a receiving unit 904, where the receiving unit 904 is configured to receive the configuration information, sent by the macro base station, about the uplink signal sent by the UE, and output the configuration information to the detecting unit 901.

In an embodiment, the configuration information about the uplink signal may at least include a sending frequency channel of the uplink signal, that is to say, the configuration information about the uplink signal may at least include a sending resource of the uplink signal.

As an optional implementation manner, in the device for detecting an uplink signal shown in FIG. 9, the uplink signal may be any one of an uplink SRS, an uplink Preamble, and an uplink DMRS, which is not limited in the embodiment of the present invention.

Based on the device for detecting an uplink signal shown in FIG. 9, the micro base station may effectively detect the uplink signal sent by the UE, so that the macro base station can identify the UE causing uplink interference to the micro base station, thereby eliminating the interference. Meanwhile, in the embodiment of the present invention, the processing burden caused by multiple times of detection constantly performed by the micro base station on all resources may also be avoided.

Figure 10:
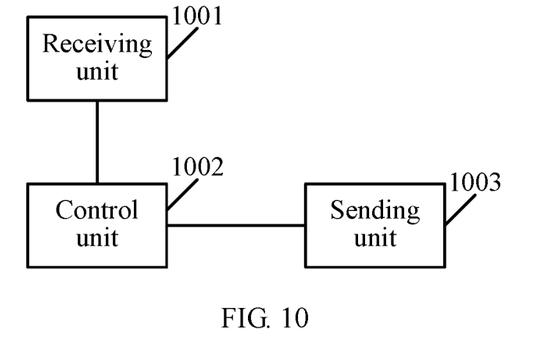
FIG. 10 is a schematic structural diagram of an embodiment of a user equipment provided in an embodiment of the present invention.

Referring to FIG. 10, FIG. 10 is a structural diagram of a user equipment provided in an embodiment of the present invention. The user equipment shown in FIG. 10 is served by a macro base station, and the user equipment is located outside a downlink coverage area of a micro base station and at an edge of the downlink coverage area of the micro base station. The macro base station and the micro base station have synchronized clock rates, and there is a fixed time difference t1 between an uplink receive window of the macro base station and an uplink receive window of the micro base station, where |t1|≥0. As shown in FIG. 10, the UE may include a receiving unit 1001, a control unit 1002, and a sending unit 1003, where the receiving unit 1001 is configured to receive a TA update message sent by the macro base station, where the TA update message is used for instructing to decrease TA allocated by the macro base station to the user equipment (that is, TA allocated by the macro base station to the user equipment in a normal situation) to preset TA;

the control unit 1002 is configured to decrease the TA allocated by the macro base station to the preset TA; and the sending unit 1003 is configured to send an uplink signal according to the preset TA after the control unit 1002 decreases the TA allocated by the macro base station to the preset TA, so that the micro base station detects the uplink signal in the uplink receive window of the macro base station according to configuration information of the sending unit 1003 for sending the uplink signal and sends the uplink signal to the macro base station, and the macro base station may identify that the UE sending the uplink signal causes uplink interference to the micro base station, thereby eliminating the interference of the UE.

As an optional implementation manner, in the user equipment shown in FIG. 10, the uplink signal may be any one of an uplink SRS, an uplink Preamble, and an uplink DMRS, which is not limited in the embodiment of the present invention.

Based on the user equipment shown in FIG. 10, the micro base station may effectively detect the uplink signal sent by the user equipment, so that the macro base station can identify that the user equipment causes uplink interference to the micro base station, and therefore, the macro base station may eliminate the interference of the user equipment. Meanwhile, based on the user equipment shown in FIG. 10, the processing burden caused by multiple times of detection constantly performed by the micro base station on all resources may also be avoided.

Figure 11:
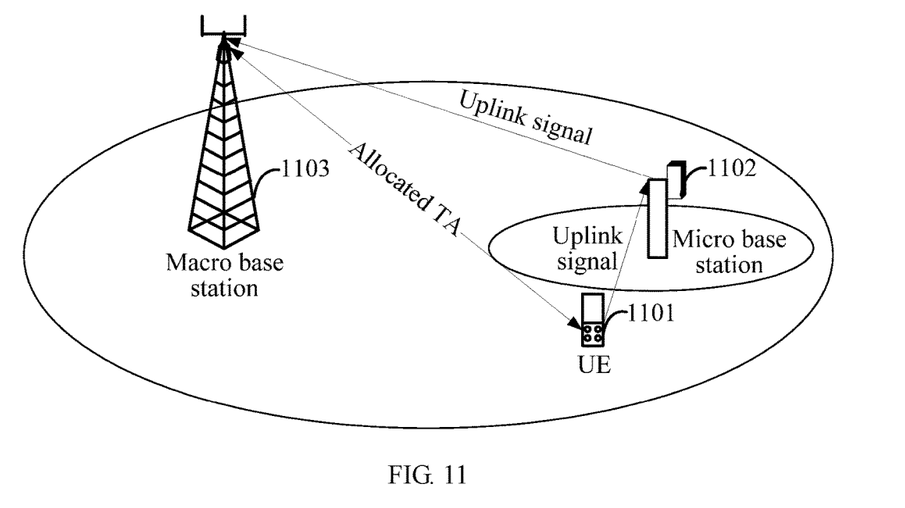
FIG. 11 and FIG. 12 are schematic structural diagrams of two embodiments of a system for detecting an uplink signal provided in an embodiment of the present invention.

Referring to FIG. 11, FIG. 11 is a structural diagram of a system for detecting an uplink signal provided in an embodiment of the present invention. As shown in FIG. 11, the system for detecting an uplink signal may include a user equipment 1101, a micro base station 1102, and a macro base station 1103. The user equipment 1101 is served by the macro base station 1103, and the user equipment 1101 is located outside a downlink coverage area of the micro base station 1102 and at an edge of the downlink coverage area of the micro base station 1102. The macro base station 1103 and the micro base station 1102 have synchronized clock rates, and there is a fixed time difference t1 between an uplink receive window of the macro base station 1103 and an uplink receive window of the micro base station 1102, where $|t1| \geq 0$.

In the system for detecting an uplink signal shown in FIG. 11, the micro base station 1102 includes a device for detecting an uplink signal (not shown in FIG. 11) having the structure shown in FIG. 9.

In the system for detecting an uplink signal shown in FIG. 11, the user equipment 1101 is configured to send an uplink signal. That is to say, the user equipment 1101 sends an uplink signal according to TA allocated by the macro base station 1103.

In the system for detecting an uplink signal shown in FIG. 11, the macro base station 1103 is configured to receive the uplink signal sent by the user equipment 1101 and detected by the micro base station 1102, and identify the user equipment 1101 as an interference source of the micro base station 1102. Further, the macro base station 1103 may eliminate interference of the user equipment 1101.

In the system for detecting an uplink signal shown in FIG. 11, the micro base station 1102 may effectively detect the uplink signal sent by the user equipment 1101, so that the macro base station 1103 can identify that the user equipment 1101 causes uplink interference to the micro base station 1102, and therefore, the macro base station 1103 may eliminate the interference of the user equipment 1101. Meanwhile, based on the system for detecting an uplink signal shown in FIG. 11, the processing burden caused by multiple times of detection constantly performed by the micro base station 1102 on all resources may also be avoided.

Figure 12:
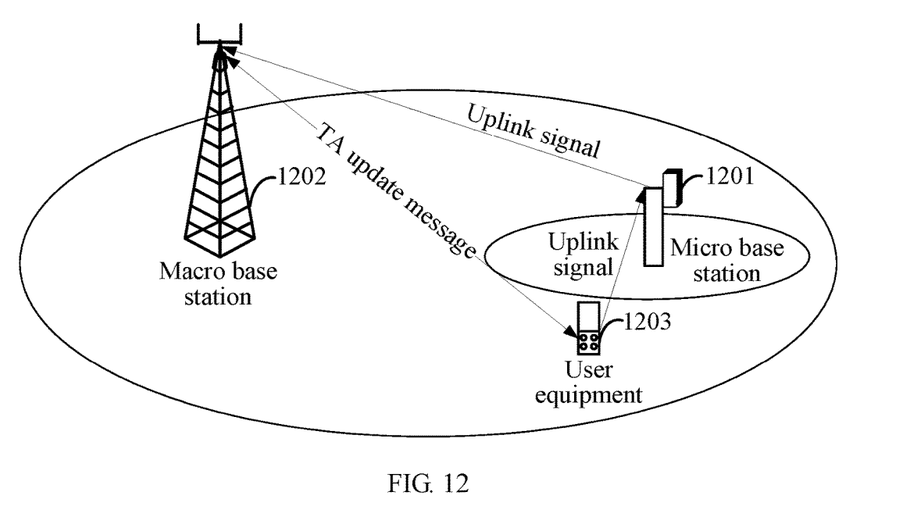

Referring to FIG. 12, FIG. 12 is a structural diagram of another system for detecting an uplink signal provided in an embodiment of the present invention. As shown in FIG. 12, the system for detecting an uplink signal may include a micro base station 1201, a macro base station 1202, and a user equipment 1203, where the structure of the user equipment 1203 may be shown in FIG. 10, which is not described herein again in the embodiment of the present invention. The user equipment 1203 is served by the macro base station 1202, and the user equipment 1203 is located outside a downlink coverage area of the micro base station 1201 and at an edge of the downlink coverage area of the micro base station 1201. The macro base station 1202 and the micro base station 1201 have synchronized clock rates, and there is a fixed time difference t1 between an uplink receive window of the macro base station 1202 and an uplink receive window of the micro base station 1201, where $|t1| \geq 0$.

The macro base station 1202 is configured to send a TA update message to the user equipment 1203, where the TA update message is used for instructing to decrease TA allocated by the macro base station 1202 to the user equipment 1203 to preset TA; and receive an uplink signal sent by the user equipment 1203 and detected by the micro base station 1201, and identify the user equipment 1203 as an interference source of the micro base station 1201.

The micro base station 1201 is configured to detect the uplink signal in the uplink receive window of the macro base station 1202 according to configuration information about the uplink signal sent by the user equipment 1203, and send the uplink signal to the macro base station 1202.

In the system for detecting an uplink signal shown in FIG. 12, the micro base station 1201 may effectively detect the uplink signal sent by the user equipment 1203, so that the macro base station 1202 can identify that the user equipment 1203 causes uplink interference to the micro base station 1201, and therefore, the macro base station 1202 may eliminate the interference of the user equipment 1203. Meanwhile, based on the system for detecting an uplink signal shown in FIG. 12, the processing burden caused by multiple times of detection constantly performed by the micro base station 1201 on all resources may also be avoided.

A person skilled in the art may understand that all or part of the steps of the method in the foregoing embodiments may be implemented by a program instructing relevant hardware. The program may be stored in a computer readable storage medium, and the storage medium may include: a flash drive, a read-only memory (ROM), a random access memory (RAM), a magnetic disk, or an optical disk.

The method for detecting an uplink signal and the relevant device and system provided by the embodiments of the present invention are introduced in detail above. The principle and implementation of the present invention are described herein through specific examples. The description about the embodiments is merely provided for ease of understanding of the method and the core ideas of the present invention. Persons of ordinary skill in the art can make variations to the present invention in terms of the specific implementation and application scopes according to the ideas of the present invention. Therefore, the specification shall not be construed as a limit to the present invention.

What is claimed is:

1. A method for detecting an uplink signal, comprising:
receiving, by a first base station, configuration information of a terminal device sent by a second base station, the first and second base stations having synchronized clock rates, the first base station having a first uplink receive window, the second base station having a second uplink receive window with a fixed time difference t1 between the first and second uplink receive windows, and |t1|≥0;
detecting, by the first base station, an uplink signal sent by the terminal device according to the configuration information of the uplink signal;
sending, by the first base station, the uplink signal or relevant information about the uplink signal to the second base station; and
upon detecting that the uplink signal is not received in the second uplink receive window, again detecting, by the first base station, the uplink signal, after the first base station advances the second uplink receive window of the second base station by a length of at least one cyclic prefix.

2. The method according to claim 1, wherein the relevant information about the uplink signal comprises an identifier of the terminal device.

3. The method according to claim 1, wherein the configuration information comprises one or more of: sending time, a hopping sequence, and a sending resource used for sending the uplink signal.

4. The method according to claim 1, wherein the uplink signal comprises one or more of: an uplink sounding reference signal, an uplink preamble, and an uplink demodulation reference signal.

5. A method for detecting an uplink signal, comprising:
sending, by a first base station, configuration information of a terminal device to a second base station, the first and second base stations having synchronized clock rates, the first base station having a first uplink receive window, the second base station having a second uplink receive window with a fixed time difference t1 between the first and second uplink receive windows, and |t1|≥0;
receiving, by the first base station, at least relevant information about the uplink signal from the second base station, wherein the uplink signal is detected by the first base station according to the configuration information of the uplink signal;
detecting, by the first base station, the user terminal causing interference based on the relevant information about the uplink signal; and
upon detecting that the uplink signal is not received in the second uplink receive window, again detecting, by the first base station, the uplink signal, after the first base station advances the second uplink receive window of the second base station by a length of at least one cyclic prefix.

6. The method according to claim 5, wherein the relevant information about the uplink signal comprises an identifier of the terminal device.

7. The method according to claim 5, wherein the configuration information comprises sending frequency of the uplink signal.

8. The method according to claim 5, wherein the configuration information comprises one or more of: sending time, a hopping sequence, and a sending resource used for sending the uplink signal.

9. The method according to claim 5, wherein the uplink signal comprises one or more of: an uplink sounding reference signal, an uplink preamble, and an uplink demodulation reference signal.

10. A first base station in communication with a second base station, the first and second base stations having synchronized clock rates, the first base station having a first uplink receive window, the second base station having a second uplink receive window with a fixed time difference t1 between the first and second uplink receive windows, and |t1|≥0, comprising:
a non-transitory computer-readable medium configured for storing processor-executable instructions; and
at least one processor, configured to execute the processor-executable instructions to perform a process including:
receiving, by the first base station, configuration information of a terminal device sent by the second base station;
detecting, by the first base station, an uplink signal sent by the terminal device according to the configuration information of the uplink signal;
sending, by the first base station, the uplink signal or relevant information about the uplink signal to the second base station; and
upon detecting that the uplink signal is not received in the second uplink receive window, again detecting, by the first base station, the uplink signal, after the first base station advances the second uplink receive window of the second base station by a length of at least one cyclic prefix.

11. The base station according to claim 10, wherein the relevant information about the uplink signal comprises an identifier of the terminal device.

12. The base station according to claim 10, wherein the configuration information comprises sending frequency of the uplink signal.

13. The base station according to claim 10, wherein the configuration information comprises one or more of: sending time, a hopping sequence, and a sending resource used for sending the uplink signal.

14. The base station according to claim 10, wherein the uplink signal comprises one or more of: an uplink sounding reference signal, an uplink preamble, and an uplink demodulation reference signal.

* * * * *